United States Patent
Miyazawa

(10) Patent No.: US 7,199,942 B2
(45) Date of Patent: Apr. 3, 2007

(54) ZOOM LENS SYSTEM AND IMAGE PICKUP APPARATUS INCLUDING THE ZOOM LENS SYSTEM

(75) Inventor: Nobuyuki Miyazawa, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/393,188

(22) Filed: Mar. 29, 2006

(65) Prior Publication Data
US 2006/0245077 A1 Nov. 2, 2006

(30) Foreign Application Priority Data
Apr. 19, 2005 (JP) .............................. 2005-121170

(51) Int. Cl.
*G02B 15/14* (2006.01)
(52) U.S. Cl. ...................... 359/687; 359/557; 359/683; 359/684
(58) Field of Classification Search ................ 359/687, 359/686, 557, 683, 684
See application file for complete search history.

(56) References Cited

U.S. PATENT DOCUMENTS

| | | | |
|---|---|---|---|
| 4,842,385 A * | 6/1989 | Tanaka | ........................ 359/683 |
| 5,189,558 A | 2/1993 | Ishii | |
| 6,226,130 B1 * | 5/2001 | Mukaiya et al. | ............. 359/687 |
| 6,441,968 B1 | 8/2002 | Okayama | |
| 6,751,029 B2 | 6/2004 | Horiuchi | |
| 2002/0063961 A1* | 5/2002 | Hamano et al. | ............. 359/557 |

FOREIGN PATENT DOCUMENTS

| | | |
|---|---|---|
| JP | 4-43311 A | 2/1992 |
| JP | 5-027167 A | 2/1993 |
| JP | 8-304700 A | 11/1996 |
| JP | 11-202198 A | 7/1999 |
| JP | 2000-121941 A | 4/2000 |
| JP | 2003-295053 A | 10/2003 |

* cited by examiner

*Primary Examiner*—N. Drew Richards
*Assistant Examiner*—James R Greece
(74) *Attorney, Agent, or Firm*—Canon USA, Inc. Intellectual Property Division

(57) ABSTRACT

At least one exemplary embodiment is directed to a zoom lens system which includes, in order from an object side to an image side, a first lens unit of positive optical power, a second lens unit of negative optical power, a third lens unit of positive optical power, and a fourth lens unit of positive optical power. At least the second and fourth lens units are moved for zooming. The third lens unit includes, in order from the object side to the image side, three lens elements, a positive lens element, a negative lens element, and a positive lens element. The fourth lens unit includes, in order from the object side to the image side, two lens elements, a positive lens element and a negative lens element. The above-described configuration of the zoom lens system allows appropriate setting of the imaging magnification of the fourth lens unit and the focal lengths of the third and fourth lens units.

8 Claims, 7 Drawing Sheets

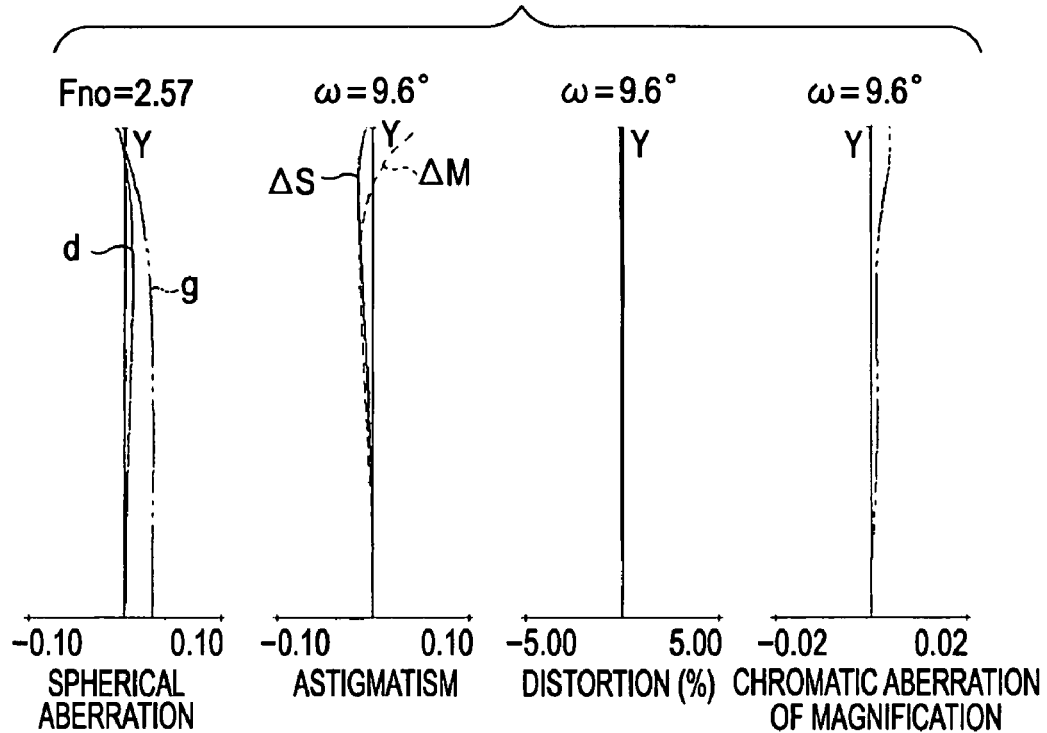
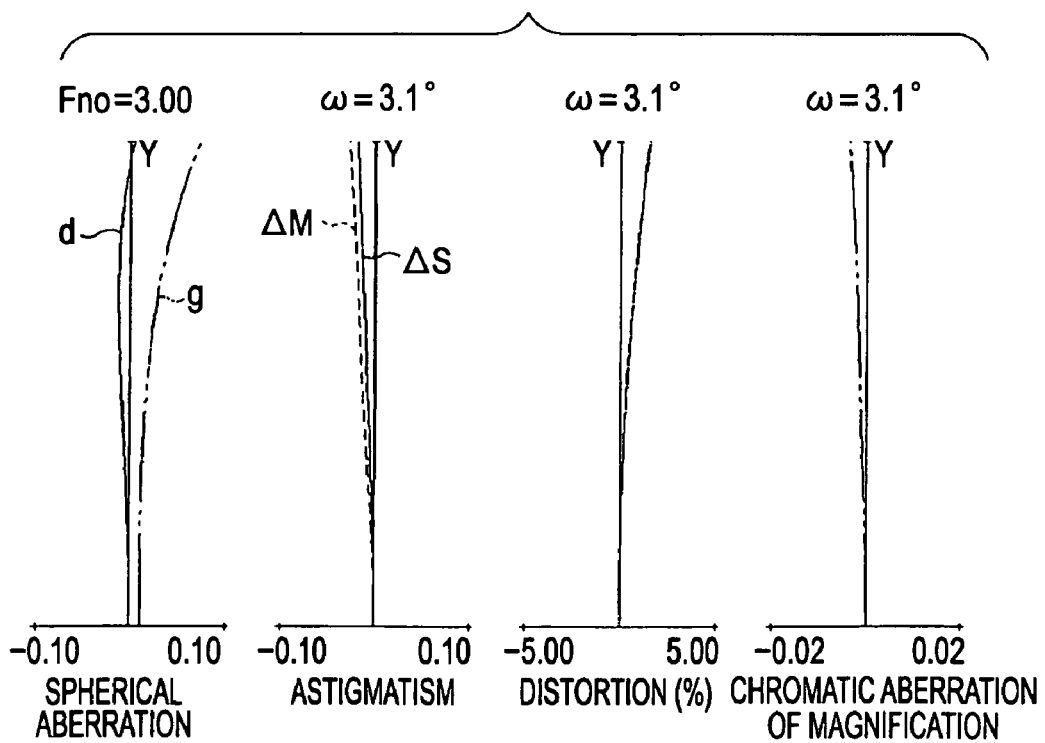

ZOOM LENS SYSTEM AND IMAGE PICKUP APPARATUS INCLUDING THE ZOOM LENS SYSTEM

BACKGROUND OF THE INVENTION

1. Field of the Invention

The present invention relates to zoom lens systems and particularly, though not exclusively, to a zoom lens system suitable for use as a photographic lens system for an image pickup apparatus.

2. Description of the Related Art

There is a market for a compact and high-resolution zoom lens system with a high zoom ratio photographic optical system for image pickup apparatuses.

To facilitate compactness, a zoom lens system that includes, in order from the object side to the image side, four lens units including a first lens unit of positive refractive power, a second lens unit of negative refractive power, a third lens unit of positive refractive power, and a fourth lens unit of positive refractive power has been developed and discussed in the following documents: Japanese Patent Laid-Open No. 8-304700, Japanese Patent Laid-Open No. 2000-121941, Japanese Patent Laid-Open No. 2003-295053, Japanese Patent Laid-Open No. 5-027167, Japanese Patent Laid-Open No. 11-202198 (corresponding to U.S. Pat. No. 6,441,968), and Japanese Patent Laid-Open No. 4-43311 (corresponding to U.S. Pat. No. 5,189,558). In the discussed zoom lens system, moving the second lens unit for zooming varies magnification, while moving the fourth lens unit compensates for image plane variations associated with variations in magnification.

A zoom lens system discussed in Japanese Patent Laid-Open No. 5-027167 has a lens configuration that facilitates a ⅓-inch or ¼-inch image pickup device and that can use a plurality of aspheric surfaces to reduce the number of lenses.

In the zoom lens system discussed in Japanese Patent Laid-Open No. 5-027167, a third lens unit includes, in order from the object side to the image side, two positive lens elements and a negative lens element to compensate mainly for spherical aberration. Therefore, in the third lens unit, the positive lens element closest to the object has high refractive power and is convex on both sides. In a positive lens element with such a shape, since there is a substantial difference in optical path length between rays near the optical axis and others near the rim of the positive lens element, it can be difficult to achieve the same level of aberration compensation for different wavelengths. Moreover, since a fourth lens unit is composed of a single positive lens element, compensation for chromatic aberration can be insufficient.

A zoom lens system discussed in Japanese Patent Laid-Open No. 4-43311 (corresponding to U.S. Pat. No. 5,189,558) includes a fourth lens unit that is composed of just one or two positive lens elements. Therefore, compensation for chromatic aberration can be insufficient. Moreover, three positive lens elements included in a third lens unit and one or two positive lens elements included in the fourth lens unit can cause an increase in the overall length of the zoom lens system.

Generally, in a zoom lens system, increasing the refractive power of each lens unit reduces the amount of movement of each lens unit for achieving a predetermined zoom ratio. This means that it is possible to increase the zoom ratio while reducing the overall length of the zoom lens system.

However, simply increasing the refractive power of each lens unit leads to larger variations in aberration during zooming and makes it difficult to provide good optical performance.

SUMMARY OF THE INVENTION

The present invention relates to a zoom lens system used as a photographic lens system for an image pickup apparatus (e.g., a video camera, a silver halide camera, or a digital still camera, and other image pickup apparatus as known by one of ordinary skill in the relevant art and equivalents.

At least one exemplary embodiment is directed to a compact zoom lens system that has a high zoom ratio and provides a high level of optical performance throughout at least a portion (e.g., the entire) zoom range, on the basis of the appropriate refractive power of each lens unit, appropriate lens configuration.

An exemplary embodiment of a zoom lens system includes, in order from the object side to the image side, a first lens unit of positive refractive power (where refractive power=optical power=inverse of focal length), a second lens unit of negative refractive power, a third lens unit of positive refractive power, and a fourth lens unit of positive refractive power. In the zoom lens system, at least the second lens unit and the fourth lens unit are moved during zooming. The third lens unit includes, in order from the object side to the image side, three lens elements including a positive lens element, a negative lens element, and a positive lens element. The fourth lens unit includes, in order from the object side to the image side, a positive lens element and a negative lens element. The following conditions can be satisfied:

$$1.2 < \beta 4t/\beta 4w < 2.5$$

$$0.76 < f3/(fw \cdot ft)^{1/2} < 0.99$$

$$2.0 < f4/fw < 3.2$$

where β4w is the imaging magnification of the fourth lens unit at a wide-angle end, β4t is the imaging magnification of the fourth lens unit at a telephoto end, f3 is the focal length of the third lens unit, f4 is the focal length of the fourth lens unit, fw is the focal length of the zoom lens system at the wide-angle end, and ft is the focal length of the zoom lens system at the telephoto end.

Further features of the present invention will become apparent from the following description of exemplary embodiments with reference to the attached drawings.

BRIEF DESCRIPTION OF THE DRAWINGS

FIG. 3 shows graphs of various aberrations of the zoom lens system according to exemplary embodiment 1 at the middle zoom position.

FIG. 4 shows graphs of various aberrations of the zoom lens system according to exemplary embodiment 1 at the telephoto end.

DESCRIPTION OF THE EMBODIMENTS

Figure 1:
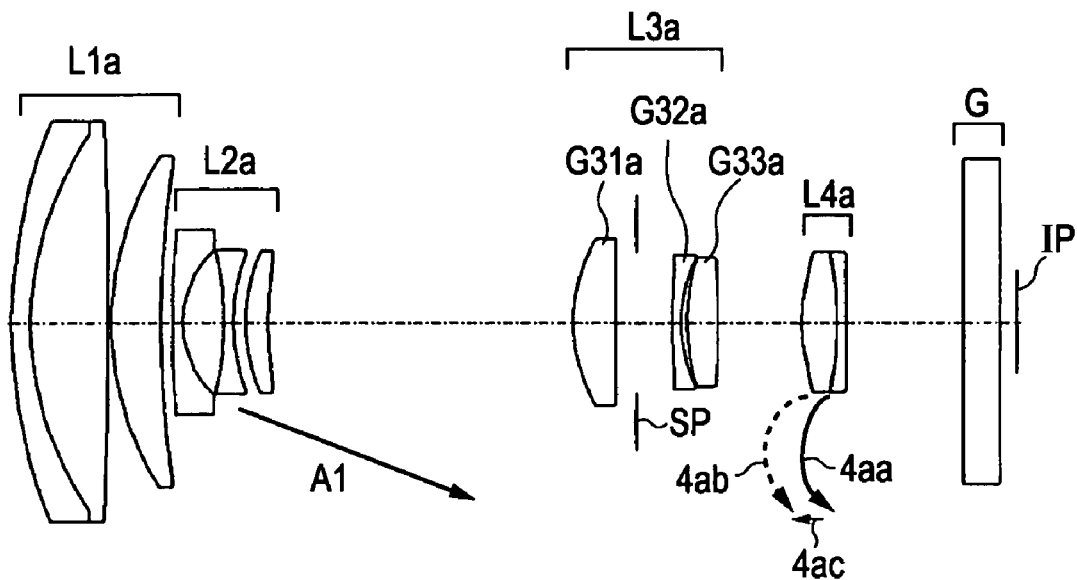
FIG. 1 shows a cross section of a zoom lens system according to exemplary embodiment 1 at the wide-angle end.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of the lens elements and their materials.

In all of the examples illustrated and discussed herein any specific values, for example the zoom ratio and F number, should be interpreted to be illustrative only and non limiting. Thus, other examples of the exemplary embodiments could have different values.

Notice that similar reference numerals and letters refer to similar items in the following figures, and thus once an item is defined in one figure, it may not be discussed for following figures.

Exemplary embodiments of a zoom lens system and an image pickup apparatus including the zoom lens system will now be described.

Figure 2:
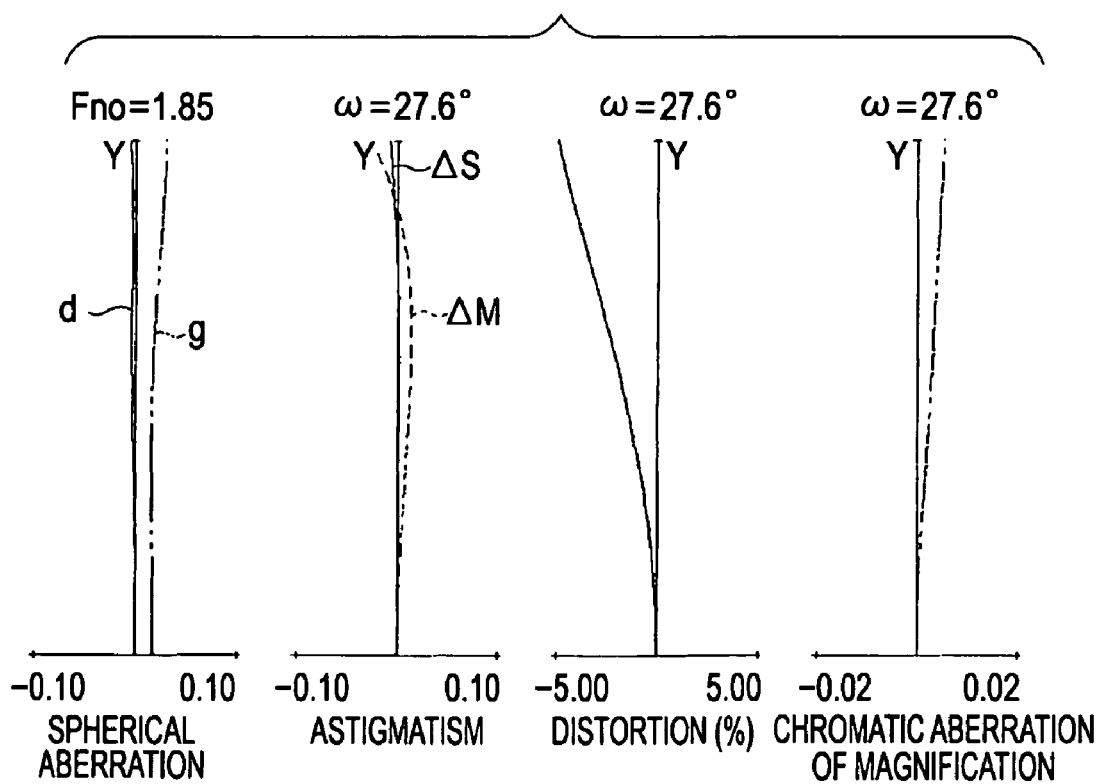
FIG. 2 shows graphs of various aberrations of the zoom lens system according to exemplary embodiment 1 at the wide-angle end.

FIG. 1 shows a cross section of the zoom lens system according to exemplary embodiment 1 at the wide-angle end. FIG. 2, FIG. 3, and FIG. 4 show graphs of various aberrations of the zoom lens system according to exemplary embodiment 1 at the wide-angle end, middle zoom position, and telephoto end, respectively, plotted along a vertical Y-axis, where the Y-axis in the spherical aberration's graph is entrance pupil radius, the Y-axis in the astigmatism's, distortion's and chromatic aberration of magnification's graphs is image height.

Figure 5:
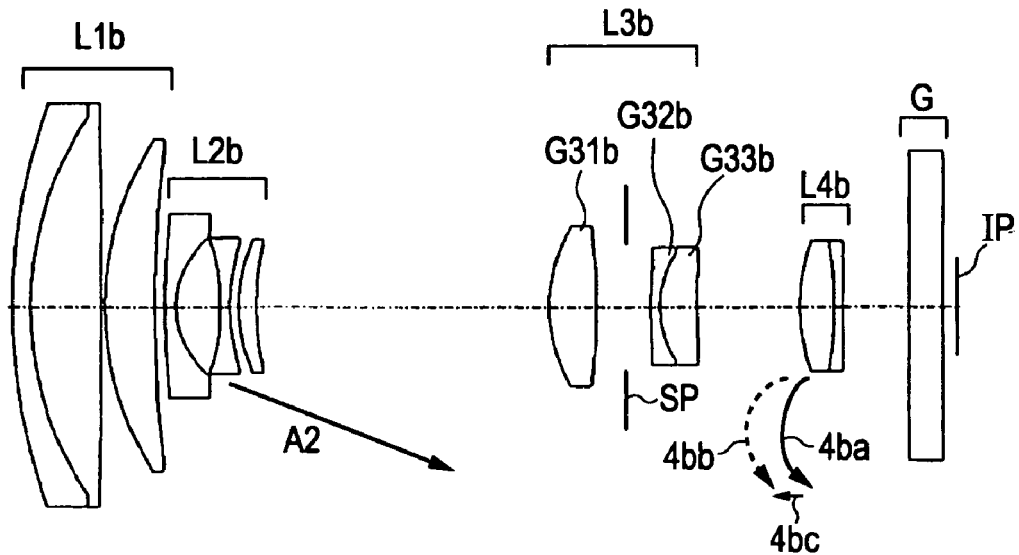
FIG. 5 shows a cross section of a zoom lens system according to exemplary embodiment 2 at the wide-angle end.
Figure 6:
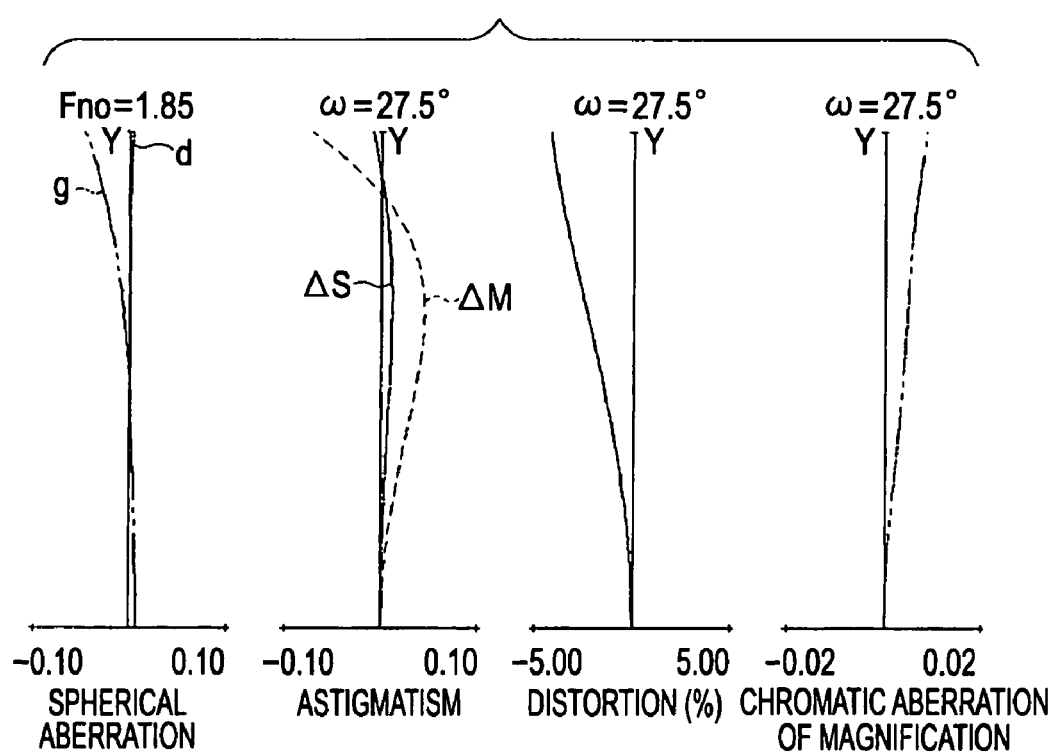
FIG. 6 shows graphs of various aberrations of the zoom lens system according to exemplary embodiment 2 at the wide-angle end.
Figure 7:
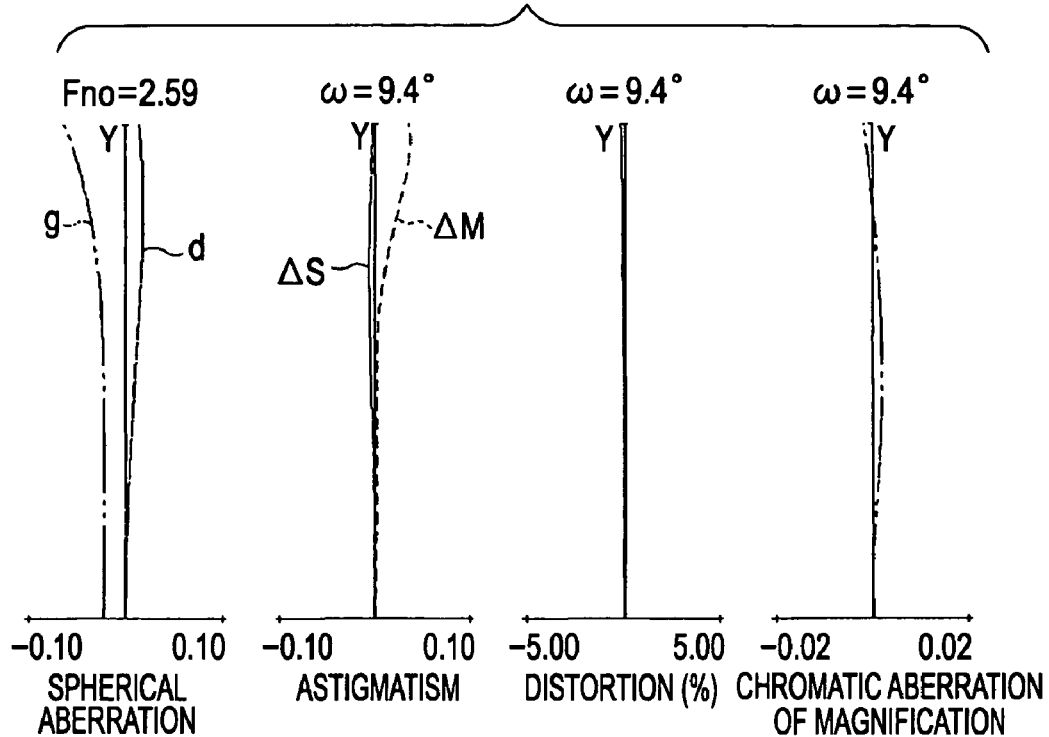
FIG. 7 shows graphs of various aberrations of the zoom lens system according to exemplary embodiment 2 at the middle zoom position.
Figure 8:
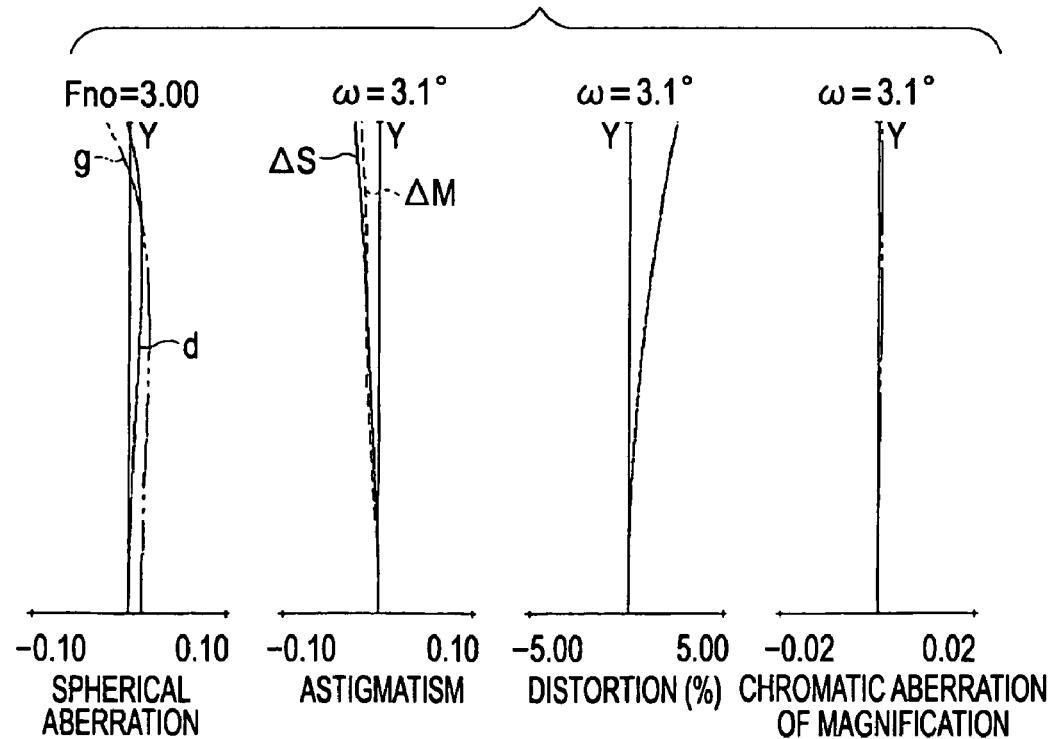
FIG. 8 shows graphs of various aberrations of the zoom lens system according to exemplary embodiment 2 at the telephoto end.

FIG. 5 shows a cross section of the zoom lens system according to exemplary embodiment 2 at the wide-angle end. FIG. 6, FIG. 7, and FIG. 8 show graphs of various aberrations of the zoom lens system according to exemplary embodiment 2 at the wide-angle end, middle zoom position, and telephoto end, respectively.

Figure 9:
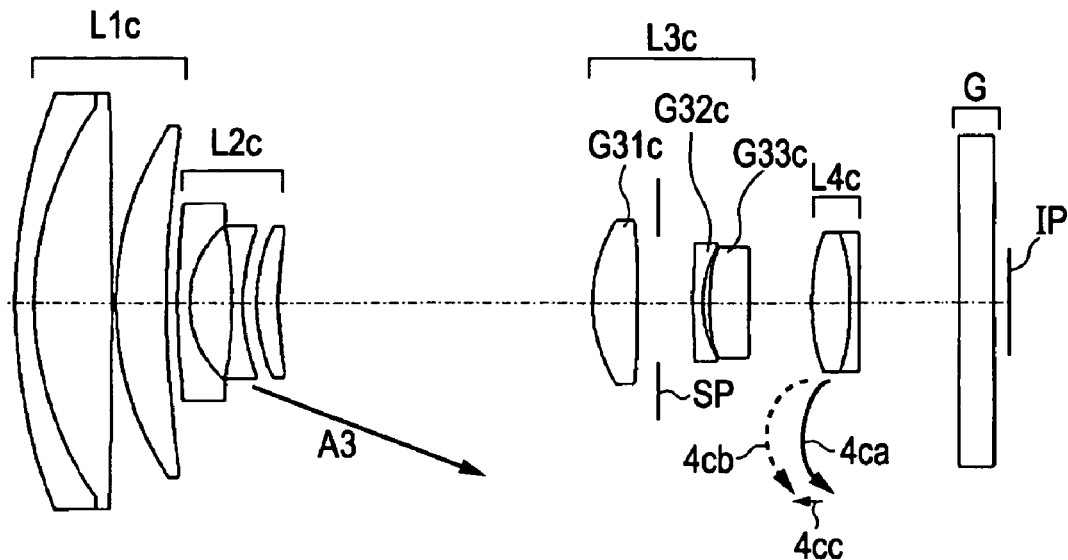
FIG. 9 shows a cross section of a zoom lens system according to exemplary embodiment 3 at the wide-angle end.
Figure 10:
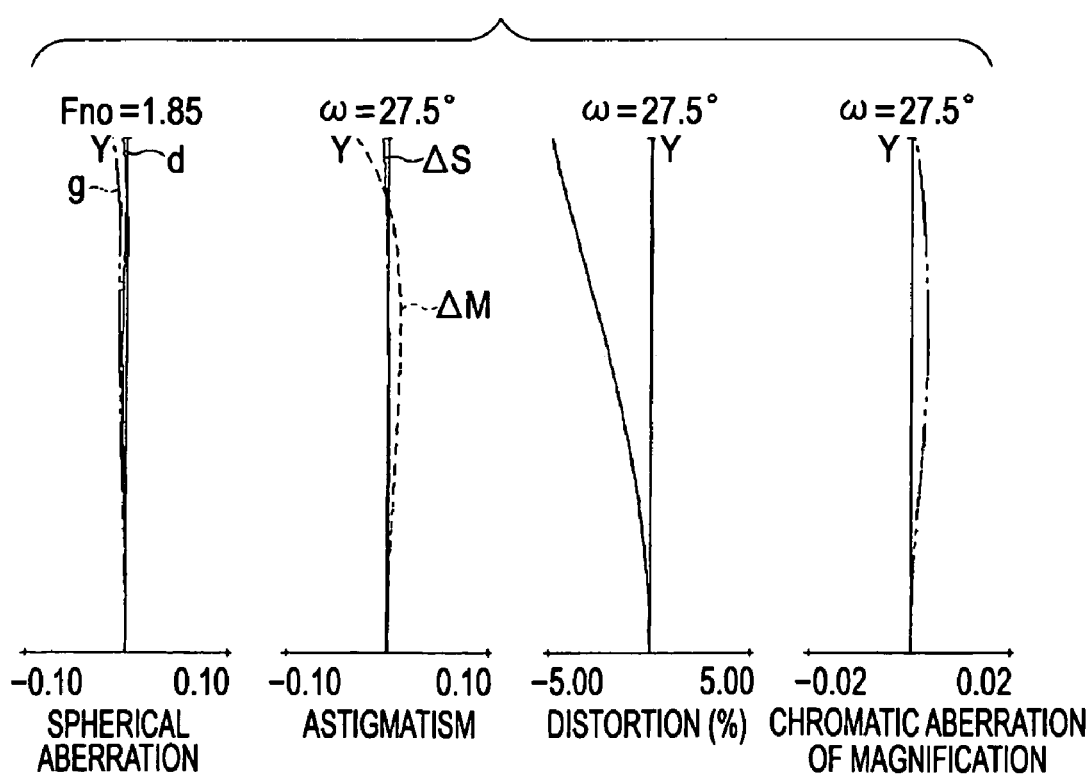
FIG. 10 shows graphs of various aberrations of the zoom lens system according to exemplary embodiment 3 at the wide-angle end.
Figure 11:
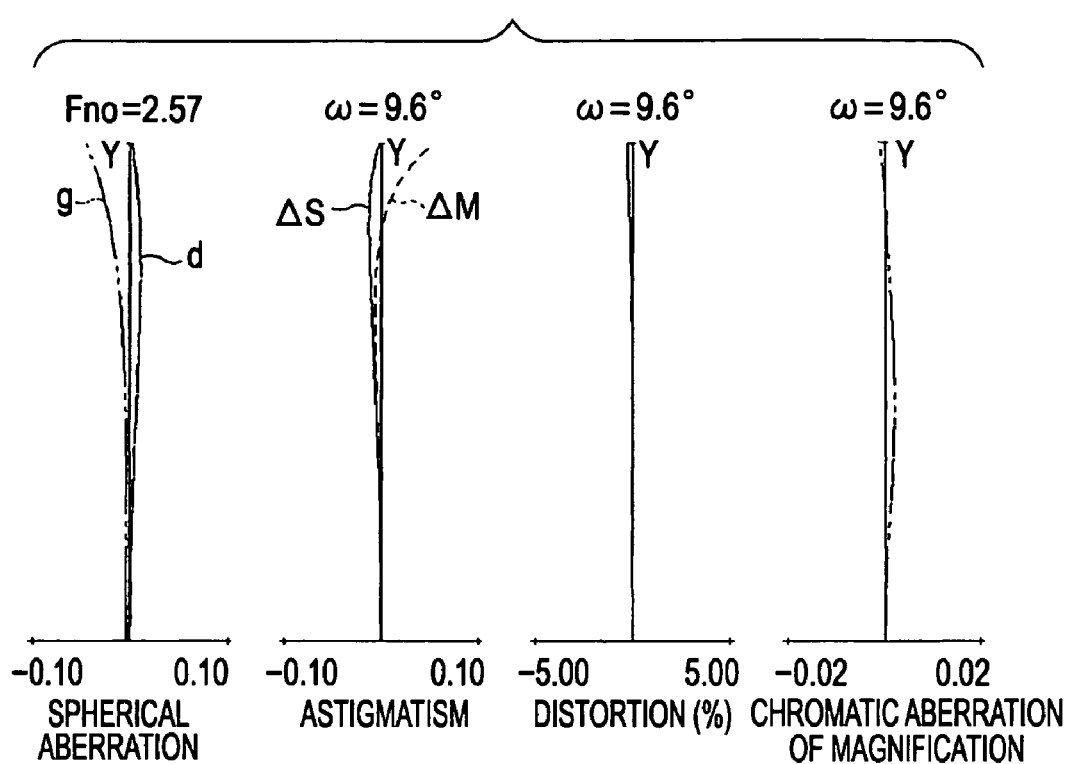
FIG. 11 shows graphs of various aberrations of the zoom lens system according to exemplary embodiment 3 at the middle zoom position.
Figure 12:
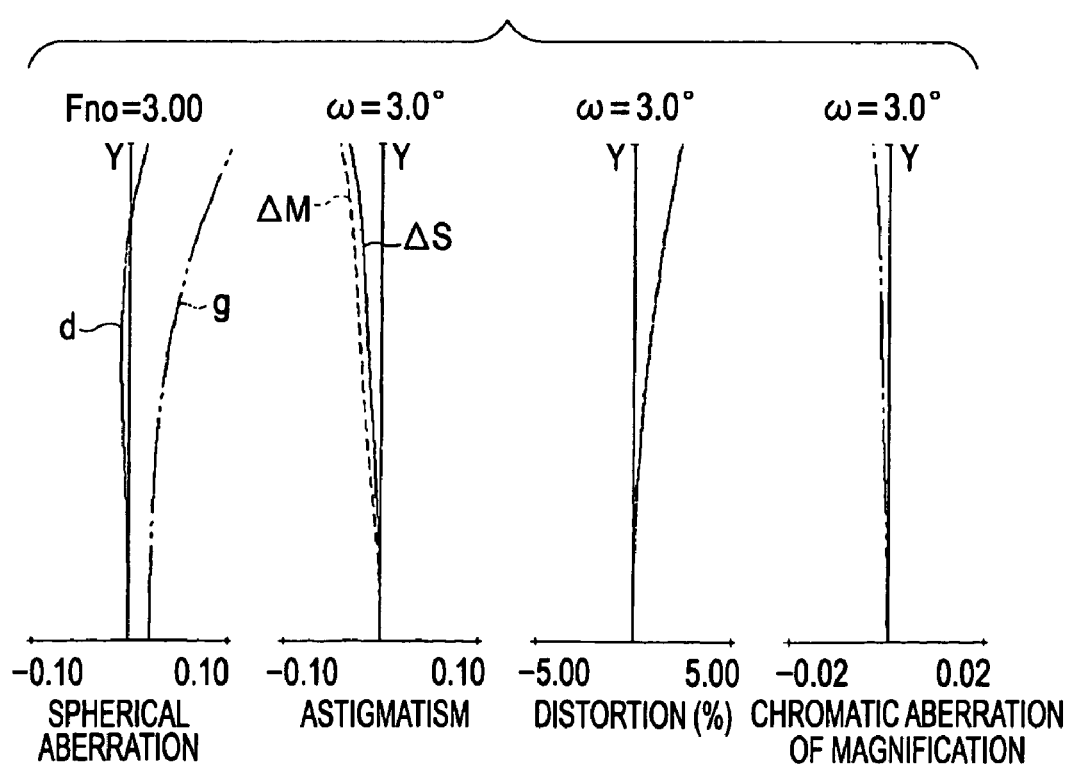
FIG. 12 shows graphs of various aberrations of the zoom lens system according to exemplary embodiment 3 at the telephoto end.

FIG. 9 shows a cross section of the zoom lens system according to exemplary embodiment 3 at the wide-angle end. FIG. 10, FIG. 11, and FIG. 12 show graphs of various aberrations of the zoom lens system according to exemplary embodiment 3 at the wide-angle end, middle zoom position, and telephoto end, respectively.

Figure 13:
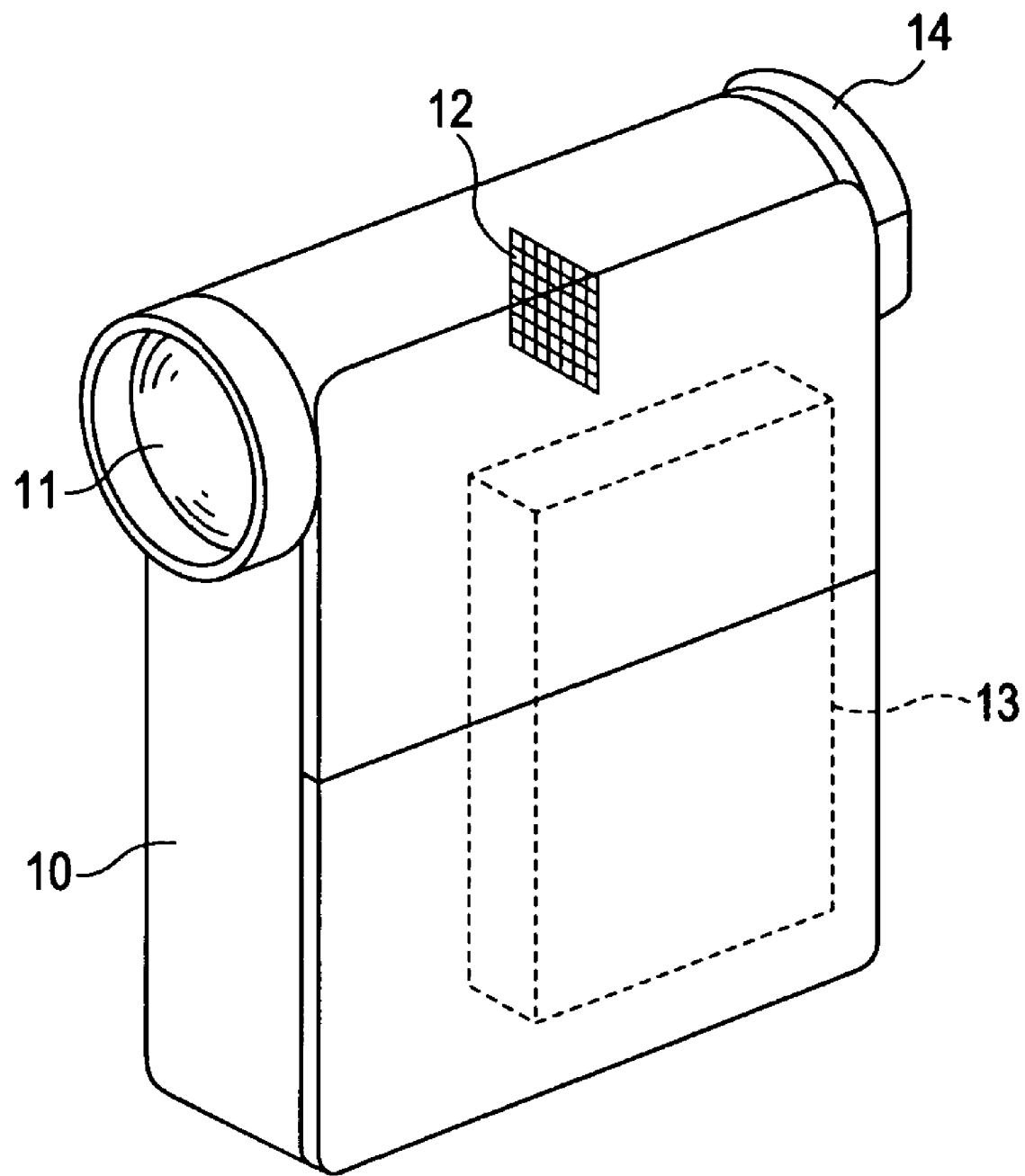
FIG. 13 is a schematic diagram showing a main part of an image pickup apparatus in accordance with at least one exemplary embodiment.

FIG. 13 is a schematic diagram showing a main part of a video camera (an example of an image pickup apparatus) including a zoom lens system of at least one exemplary embodiment.

A zoom lens system according to at least one exemplary embodiment can be used as a photographic lens system in an image pickup apparatus. In each of the cross-sectional views (FIG. 1, FIG. 5, and FIG. 9), the left side corresponds to the object side (or front side), and the right side corresponds to the image side (or rear side).

If the zoom lens system in each exemplary embodiment is used as a projection lens system for a projector, the left side corresponds to a screen and the right side corresponds to a projected image.

The zoom lens system shown in each of FIG. 1, FIG. 5, and FIG. 9 includes a first lens unit L1 of positive refractive power (refractive power=optical power=inverse of focal length), a second lens unit L2 of negative refractive power, a third lens unit L3 of positive refractive power, and a fourth lens unit L4 of positive refractive power, where an aperture stop SP is located in the third lens unit L3.

An optical block G corresponds to an optical filter, a face plate, or other equivalent filter as known by one of ordinary skill in the relevant art. If the zoom lens system in each exemplary embodiment is used as a photographic optical system for a video camera or a digital camera, an image plane IP corresponds to an imaging surface of a solid-state image pickup device (photoelectric converter), such as a charge-coupled device (CCD) sensor and a complementary metal oxide semiconductor (CMOS) sensor. If the zoom lens system is used as a photographic optical system for a silver salt film camera, the image plane IP corresponds to a film surface.

In aberration graphs of each exemplary embodiment, d and g denote a d-line and a g-line, respectively; and $\Delta M$ and $\Delta S$ denote a meridional image plane and a sagittal image plane, respectively. The g-line represents chromatic aberration of magnification (lateral chromatic aberration).

In each exemplary embodiment, a wide-angle end and a telephoto end are zoom positions when a lens unit for varying magnification (i.e., second lens unit) is located at each of both ends of the mechanically movable range along the optical axis.

In each exemplary embodiment, during zooming from the wide-angle end to the telephoto end, the second lens unit L2a–c is moved (e.g., A1, A2, and A3) to the image side, as indicated by an arrow in FIG. 1, FIG. 5, and FIG. 9, to vary the magnification, while the fourth lens unit L4a–c is moved (e.g., 4aa, 4ab, and 4ac) along a locus convex to the object side to compensate for image plane variations associated with variations in magnification.

In each exemplary embodiment, focusing is performed by a rear-focusing type method in which the fourth lens unit L4a–c is moved (e.g., 4ac, 4bc, and 4cc) along the optical axis. A solid curve 4aa–c and a dotted curve 4ba–c represent the movements of the fourth lens unit L4a–c for compensating for image plane variations associated with variations in magnification, during focusing on an infinite object and a close object, respectively. Since the fourth lens unit L4a–c is moved along locus convex toward the object side, effective use of space between the third lens unit L3a–c and the fourth lens unit L4a–c is achieved and the overall length of the zoom lens system can be reduced effectively.

To perform focusing, at the wide-angle end, from an infinite object to a close object, the fourth lens unit L4a–c is moved forward as indicated by an arrow 4ca–c.

In each exemplary embodiment, the first lens unit L1a–c, the third lens unit L3a–c, and the aperture stop SP; which are not moved along the optical axis for zooming and focusing, can be moved as necessary for compensating for aberrations.

In the zoom lens system of each exemplary embodiment, an aperture ratio (inverse of F-number) at the wide-angle end is determined on the basis of the diameter of a light beam in or near the third lens unit L3a–c. According to at least one exemplary embodiment, the third lens unit L3 can compensate for spherical aberrations and longitudinal chromatic aberrations at the wide-angle end, but also can compensate for field curvature throughout at least a portion of the (e.g., in some cases the entire zoom range) zoom range from the wide-angle end to the telephoto end. Therefore, in each exemplary embodiment, the third lens unit L3a–c includes, in order from the object side to the image side, a first lens group including three lens elements being a positive lens element G31a–c, a negative lens element G32a–c, and a positive lens element G33a–c. Moreover, a fourth lens unit L4a–c includes second lens group which can include a pair of positive and negative lens elements, in order from the object side to the image side. Such a lens configuration allows effective compensation for spherical aberrations and longitudinal chromatic aberrations at the wide-angle end.

Generally, for a plurality of surfaces close to each other in an optical system, it can be difficult to effectively compensate for different types of aberrations, such as spherical aberrations and field curvature.

In the third lens unit L3a–c of the zoom lens system according to each exemplary embodiment, lens elements can be arranged such that two surfaces that are not next to each other in the traveling direction of a light beam are aspheric surfaces. This not only allows effective compensation for spherical aberrations at the wide-angle end, but also allows the effective compensation for field curvature throughout at least a portion of (e.g., the entire) the zoom range. Similar effects can be achieved if two surfaces next to each other in the traveling direction of a light beam are sufficiently spaced apart. However, this is not preferable, as this can cause an increase in the overall length of the zoom lens system.

In exemplary embodiment 1, a lens surface on the object side of the positive lens element G31a and a lens surface on the object side of the positive lens element G33a are aspheric. In exemplary embodiment 2, a lens surface on the object side of the positive lens element G31b and a lens surface on the image side of the positive lens element G33b are aspheric. In exemplary embodiment 3, a lens surface on the object side of the positive lens element G31c and a lens surface on the image side of the negative lens element G32c are aspheric.

In each exemplary embodiment, the above-described simple configuration of each lens unit not only can reduce the overall size of the lens system, but also can provide high optical performance throughout at least a portion of the (e.g., the entire) zoom range and along at least a portion of the (e.g., the entire) length to the object.

In the zoom lens system of each exemplary embodiment, the first lens unit L1a–c and the second lens unit L2a–c are configured as follows.

The first lens unit L1a–c includes, in order from the object side to the image side, a combination (e.g., a cemented) lens formed by bonding a negative meniscus lens element, which can have a convex surface on the object side to a positive lens element, and a positive meniscus lens element, which can have a convex surface on the object side.

The second lens unit L2a–c includes, in order from the object side to the image side, a negative lens element in which the absolute value of the refractive power of a surface on the image side is greater than that of a surface on the object side, a biconcave negative lens element, and a positive lens element, which can have a convex surface on the object side.

This configuration of the second lens unit L2a–c allows effective compensation for various aberrations, such as field curvature and distortion, that change during zooming.

Other features of each exemplary embodiment will now be described.

The following conditions can be satisfied in at least one exemplary embodiment:

$$1.2 < \beta 4t/\beta 4w < 2.5 \quad (1)$$

$$0.76 < f3/(fw \cdot ft)^{1/2} < 0.99 \quad (2)$$

$$2.0 < f4/fw < 3.2 \quad (3)$$

where $\beta 4w$ is the imaging magnification of the fourth lens unit L4a–c at the wide-angle end, $\beta 4t$ is the imaging magnification of the fourth lens unit L4a–c at the telephoto end, f3 is the focal length of the third lens unit L3a–c, f4 is the focal length of the fourth lens unit L4a–c, fw is the focal length of the zoom lens system at the wide-angle end, and ft is the focal length of the zoom lens system at the telephoto end.

The conditional expression (1) defines the magnification of the fourth lens unit L4a–c for efficiently achieving a predetermined zoom ratio. If the upper limit of the conditional expression (1) is exceeded, the fourth lens unit L4a–c at the telephoto end is moved significantly to the image side. This can make it difficult to ensure sufficient back focus (space). On the other hand, if the lower limit of the conditional expression (1) is exceeded, it can be necessary in some circumstances to increase the refractive power of the second lens unit L2 during zooming to achieve a predetermined zoom ratio without changing the overall length of the zoom lens system. However, this can make it difficult to effectively compensate for field curvature and distortion throughout the entire zoom range.

The conditional expression (2) defines the focal length of the third lens unit L3a–c. If the upper limit of the conditional expression (2) is exceeded and the focal length of the third lens unit L3a–c increases, the overall length of the zoom lens system increases accordingly. On the other hand, if the lower limit of the conditional expression (2) is exceeded and the focal length of the third lens unit L3a–c decreases, it can become difficult to compensate for spherical aberrations and longitudinal chromatic aberrations mainly at the wide-angle end.

The conditional expression (3) defines the focal length of the fourth lens unit L4a–c. If the upper limit of the conditional expression (3) is exceeded, an excessive increase in back focus results in an increase in the overall length of the zoom lens system. Moreover, since the amount of movement of the fourth lens unit L4a–c becomes larger than the case where the conditional expression (3) is satisfied, the distance between the third lens unit L3a–c and the fourth lens unit L4a–c along the optical axis can be reduced at some zoom positions, where it can be difficult to ensure sufficient space to accommodate a lens barrel and a light-shielding member. On the other hand, if the lower limit of the conditional expression (3) is exceeded and the focal length of the fourth lens unit L4a–c decreases, it becomes difficult to ensure sufficient back focus (space). Moreover, since the amount of aberrations that occur in the fourth lens unit L4a–c increases, the number of lens elements and aspheric surfaces can be increased.

In at least one exemplary embodiment the numerical range of each of the conditional expressions (1) to (3) can be defined as follows:

$$1.3 < \beta 4t/\beta 4w < 2.4 \quad (1a)$$

$$0.74 < f3/(fw \cdot ft)^{1/2} < 0.96 \quad (2a)$$

$$2.1 < f4/fw < 3.1 \quad (3a)$$

The following condition can also be satisfied:

$$0.33 < D3a/TD3 < 0.40 \quad (4)$$

where, in the third lens unit L3a–c, D3a is the distance between the positive lens element G31a–c (closest to the object) and the negative lens element G32a–c (second closest to the object), and TD3 is the distance between a lens surface closest to the object and a lens surface closest to the image (i.e., the thickness of the third lens unit L3a–c along the optical axis).

The conditional expression (4) defines the distance between the positive lens element G31a–c and the negative lens element G32a–c in the third lens unit L3a–c. If the upper limit of the conditional expression (4) is exceeded, the overall length of the zoom lens system increases or it becomes difficult to process the lens elements due to their reduced thickness. On the other hand, if the lower limit of the conditional expression (4) is exceeded, it can become difficult to effectively compensate, at the wide-angle end, for spherical aberrations and field curvature throughout the entire zoom range.

In at least one further exemplary embodiment the numerical range of the conditional expression (4) can be defined as follows:

$$0.34 < D3a/TD3 < 0.39 \quad (4a)$$

The following condition can also be satisfied:

$$-0.20 < f4/R4r < 0.20 \quad (5)$$

where, in the fourth lens unit L4a–c, R4r is the curvature radius of a lens surface closest to the image.

The conditional expression (5) defines, in the fourth lens unit L4a–c, the curvature radius of the lens surface closest to the image. If the upper limit of the conditional expression (5) is exceeded, the excessive positive refractive power of a lens surface closest to the object makes it difficult to effectively compensate for spherical aberrations. Moreover, the lens surface closest to the image becomes strongly concave, collects light reflected off a face plate, an optical low-pass filter, or other equivalent filter as known by one of ordinary skill in the relevant art disposed on the light incidence side of a solid-state image pickup device (e.g., a CCD sensor), and can easily cause significant ghost images. On the other hand, if the lower limit of the conditional expression (5) is exceeded, an increase in the positive refractive power of the lens surface closest to the image and an excessive decrease in the positive refractive power of the lens surface closest to the objective make it difficult to effectively compensate for spherical aberrations.

In at least one exemplary embodiment the numerical range of the conditional expression (5) can be defined as follows:

$$-0.15 < f4/R4r < 0.15 \quad (5a)$$

An effective way to efficiently increase the zoom ratio without increasing the overall length of the zoom lens system is to move the second lens unit L2a–c to minimize the distance to the third lens unit L3a–c at the telephoto end. However, placing an aperture stop on the object side of the third lens unit L3a–c can interfere with the movement of the second lens unit L2a–c in the process of approaching the third lens unit L3a–c at the telephoto end. Therefore, in the zoom lens system of at least one exemplary embodiment, the aperture stop SP can be arranged in the third lens unit L3a–c such that the second lens unit L2a–c and the third lens unit L3a–c approach each other at the telephoto end. In the third lens unit L3a–c of each exemplary embodiment, the positive lens element G31a–c and the negative lens element G32a–c are spaced apart in the range defined by the conditional expression (4) and provide space therebetween to allow the aperture stop SP to be placed.

The following conditions can be satisfied:

$$4.9 < f1/fw < 5.5 \quad (6)$$

$$-0.42 < f2/(fw \cdot ft)^{1/2} < -0.35 \quad (7)$$

where f1 is the focal length of the first lens unit L1 and f2 is the focal length of the second lens unit L2.

The conditional expression (6) defines the focal length of the first lens unit L1a–c. If the upper limit of the conditional expression (6) is exceeded and the focal length of the first lens unit L1a–c becomes excessively large, effects achieved by moving the second lens unit L2a–c to vary the magnification are reduced. Moreover, an increase in the amount of movement of the second lens unit L2a–c for varying the magnification to ensure a sufficient zoom ratio leads to an increase in the overall length of the zoom lens system. On the other hand, if the lower limit of the conditional expression (6) is exceeded and the focal length of the first lens unit L1a–c becomes excessively small, spherical aberrations and longitudinal chromatic aberrations at the telephoto end for which the first lens unit L1a–c mainly compensates deteriorate.

The conditional expression (7) defines the focal length of the second lens unit L2a–c. If the upper limit of the conditional expression (7) is exceeded and the refractive power of the second lens unit L2a–c becomes excessively high, it can become difficult to compensate for field curvature and distortion throughout the entire zoom range. On the other hand, if the lower limit of the conditional expression (7) is exceeded and the refractive power of the second lens unit L2a–c becomes excessively low, the amount of movement of the second lens unit L2a–c for varying the magnification can increase. This can make it difficult to reduce the overall length of the zoom lens system.

In at least one further exemplary embodiment, the numerical range of each of the conditional expressions (6) and (7) can be defined as follows:

$$5.0 < f1/fw < 5.4 \quad (6a)$$

$$-0.41 < f2/(fw \cdot ft)^{1/2} < -0.36 \quad (7a)$$

According to each exemplary embodiment described above, a zoom lens system that has a short overall length and provides high optical performance can be realized.

Next, Numerical Examples 1, 2, and 3 corresponding to Exemplary embodiments 1, 2, and 3, respectively, will be described. In each numerical example, "i" denotes the order of a surface from the object side, Ri denotes the curvature radius of the i-th surface, Di denotes a distance between the i-th surface and the (i+1)-th surface, Ni denotes a refractive index with respect to the d-line, and vi denotes an Abbe number with respect to the d-line.

In each of Numerical Examples 1 to 3, two flat surfaces closest to the image are the surfaces of the optical block G.

The amount of displacement X of an aspheric surface, along the optical axis and with respect to a surface vertex, at a height h from the optical axis is expressed as follows:

$$x = \frac{(1/R)h^2}{1+\sqrt{(1-(1+k)(h/R)^2)}} + Bh^4 + Ch^6$$

where R is a paraxial curvature radius, k is a conic constant, and B and C are aspheric coefficients.

In addition, "e-X" means "$\times 10^{-X}$", f denotes a focal length, Fno denotes an F-number, and ω denotes a half field angle. The relationship between the respective conditional expressions described above and various numerical values in the numerical examples will be shown in Table 1.

NUMERICAL EXAMPLE 1 f = 6.26–60.91  Fno = 1.85–3.00  2ω = 55.2°–6.2°

| | | | | | |
|---|---|---|---|---|---|
| R1 = | 34.455 | D1 = 1.20 | N1 = 1.846660 | v1 = 23.9 |
| R2 = | 21.767 | D2 = 4.80 | N2 = 1.487490 | v2 = 70.2 |
| R3 = | −302.945 | D3 = 0.20 | | |
| R4 = | 20.075 | D4 = 3.05 | N3 = 1.603112 | v3 = 60.6 |
| R5 = | 68.710 | D5 = Variable | | |
| R6 = | 67.686 | D6 = 0.70 | N4 = 1.882997 | v4 = 40.8 |
| R7 = | 6.518 | D7 = 2.55 | | |
| R8 = | −20.228 | D8 = 0.60 | N5 = 1.487490 | v5 = 70.2 |
| R9 = | 13.170 | D9 = 0.75 | | |
| R10 = | 11.499 | D10 = 1.40 | N6 = 1.922860 | v6 = 18.9 |
| R11 = | 28.242 | D11 = Variable | | |
| R12 = | 10.234 | D12 = 2.70 | N7 = 1.693500 | v7 = 53.2 |
| R13 = | ∞ | D13 = 1.30 | | |
| R14 = | Stop | D14 = 2.20 | | |
| R15 = | 57.675 | D15 = 0.60 | N8 = 1.846660 | v8 = 23.9 |
| R16 = | 9.699 | D16 = 0.40 | | |
| R17 = | 14.563 | D17 = 1.90 | N9 = 1.583126 | v9 = 59.4 |
| R18 = | −46.395 | D18 = Variable | | |
| R19 = | 15.479 | D19 = 2.20 | N10 = 1.804000 | v10 = 46.6 |
| R20 = | −19.786 | D20 = 0.60 | N11 = 1.846660 | v11 = 23.9 |
| R21 = | −300.001 | D21 = Variable | | |
| R22 = | ∞ | D22 = 2.21 | N12 = 1.516330 | v12 = 64.1 |
| R23 = | ∞ | | | |

| | \Focal Length | | |
|---|---|---|---|
| Variable Spacing\ | 6.26 | 19.41 | 60.91 |
| D5 | 0.70 | 12.16 | 19.18 |
| D11 | 19.23 | 7.77 | 0.75 |
| D18 | 5.34 | 2.39 | 9.66 |
| D21 | 7.48 | 10.42 | 3.15 |

Aspheric Coefficients

| | | | |
|---|---|---|---|
| R12 | k = −2.43759e−01 | B = −5.03257e−05 | C = −3.03480e−07 |
| R17 | k = −7.91694e−01 | B = −6.71555e−05 | C = 0.00000e+00 |

NUMERICAL EXAMPLE 2 f = 6.28–61.57  Fno = 1.85–3.00  2ω = 55.0°–6.1°

| | | | | | |
|---|---|---|---|---|---|
| R1 = | 39.498 | D1 = 1.20 | N1 = 2.003300 | v1 = 28.3 |
| R2 = | 22.737 | D2 = 4.78 | N2 = 1.592400 | v2 = 68.3 |
| R3 = | −687.265 | D3 = 0.20 | | |
| R4 = | 20.473 | D4 = 3.33 | N3 = 1.592400 | v3 = 68.3 |
| R5 = | 87.940 | D5 = Variable | | |
| R6 = | 66.529 | D6 = 0.70 | N4 = 1.696797 | v4 = 55.5 |
| R7 = | 5.916 | D7 = 2.95 | | |
| R8 = | −14.937 | D8 = 0.60 | N5 = 1.487490 | v5 = 70.2 |
| R9 = | 14.803 | D9 = 0.57 | | |
| R10 = | 10.951 | D10 = 1.15 | N6 = 1.922860 | v6 = 18.9 |
| R11 = | 20.569 | D11 = Variable | | |
| R12 = | 9.943 | D12 = 3.05 | N7 = 1.693500 | v7 = 53.2 |
| R13 = | −41.794 | D13 = 2.00 | | |
| R14 = | Stop | D14 = 1.60 | | |
| R15 = | 80.742 | D15 = 0.60 | N8 = 1.805181 | v8 = 25.4 |
| R16 = | 6.725 | D16 = 2.53 | N9 = 1.487490 | v9 = 70.2 |
| R17 = | 293.660 | D17 = Variable | | |
| R18 = | 12.639 | D18 = 2.30 | N10 = 1.804000 | v10 = 46.6 |
| R19 = | −23.953 | D19 = 0.60 | N11 = 1.834000 | v11 = 37.2 |
| R20 = | 603.052 | D20 = Variable | | |
| R21 = | ∞ | D21 = 2.21 | N12 = 1.516330 | v12 = 64.1 |
| R22 = | ∞ | | | |

| | \Focal Length | | |
|---|---|---|---|
| Variable Spacing\ | 6.28 | 19.77 | 61.57 |
| D5 | 0.70 | 12.54 | 19.20 |
| D11 | 19.34 | 7.50 | 0.84 |
| D17 | 6.72 | 3.17 | 9.48 |
| D20 | 4.34 | 7.89 | 1.58 |

Aspheric Coefficients

| | | | |
|---|---|---|---|
| R12 | k = −5.00073e−01 | B = −6.09516e−05 | C = −2.37695e−07 |
| R17 | k = 5.43630e+03 | B = 2.33393e−04 | C = 0.00000e+00 |

NUMERICAL EXAMPLE 3 f = 6.28–62.82  Fno = 1.85–3.00  2ω = 55.0°–6.0°

| | | | | | |
|---|---|---|---|---|---|
| R1 = | 36.104 | D1 = 1.20 | N1 = 1.846660 | v1 = 23.9 |
| R2 = | 21.717 | D2 = 4.80 | N2 = 1.516330 | v2 = 64.1 |
| R3 = | −446.101 | D3 = 0.20 | | |
| R4 = | 20.034 | D4 = 3.10 | N3 = 1.603112 | v3 = 60.6 |
| R5 = | 69.438 | D5 = Variable | | |
| R6 = | 55.981 | D6 = 0.70 | N4 = 1.882997 | v4 = 40.8 |
| R7 = | 6.599 | D7 = 2.59 | | |
| R8 = | −24.148 | D8 = 0.60 | N5 = 1.487490 | v5 = 70.2 |
| R9 = | 12.501 | D9 = 0.87 | | |
| R10 = | 11.342 | D10 = 1.35 | N6 = 1.922860 | v6 = 18.9 |
| R11 = | 26.476 | D11 = Variable | | |
| R12 = | 8.969 | D12 = 2.79 | N7 = 1.693500 | v7 = 53.2 |
| R13 = | −54.137 | D13 = 1.30 | | |
| R14 = | Stop | D14 = 2.07 | | |
| R15 = | 59.560 | D15 = 0.60 | N8 = 1.846660 | v8 = 23.9 |
| R16 = | 6.958 | D16 = 0.37 | | |
| R17 = | 10.684 | D17 = 2.44 | N9 = 1.487490 | v9 = 70.2 |
| R18 = | 228.828 | D18 = Variable | | |
| R19 = | 12.580 | D19 = 2.39 | N10 = 1.834807 | v10 = 42.7 |
| R20 = | −15.412 | D20 = 0.60 | N11 = 1.761821 | v11 = 26.5 |
| R21 = | −1232.856 | D21 = Variable | | |
| R22 = | ∞ | D22 = 2.21 | N12 = 1.516330 | v12 = 64.1 |
| R23 = | ∞ | | | |

-continued f = 6.28–62.82 Fno = 1.85–3.00 2ω = 55.0°–6.0°

| Variable Spacing\ | Focal Length\ | | |
|---|---|---|---|
| | 6.28 | 19.39 | 62.82 |
| D5 | 0.70 | 12.16 | 19.18 |
| D11 | 19.18 | 7.72 | 0.70 |
| D18 | 3.87 | 1.65 | 8.94 |
| D21 | 6.13 | 8.34 | 1.05 |

Aspheric Coefficients

R12  k = −3.52744e−01  B = −7.91814e−05  C = −1.02120e−06
R16  k = −4.38557e−01  B = 2.54699e−04   C = 0.00000e+00

TABLE 1

| Conditional Expression | Numerical Example | | |
|---|---|---|---|
| | 1 | 2 | 3 |
| (1) | 1.57 | 1.35 | 2.30 |
| (2) | 0.942 | 0.799 | 0.933 |
| (3) | 3.04 | 2.60 | 2.23 |
| (4) | 0.385 | 0.368 | 0.352 |
| (5) | −0.064 | 0.027 | −0.011 |
| (6) | 5.18 | 5.26 | 5.18 |
| (7) | −0.384 | −0.368 | −0.396 |

Next, an exemplary video camera that uses the zoom lens system of at least one exemplary embodiment as a photographic optical system will be described.

Referring to FIG. 13, a video camera includes a camera body 10; a photographic optical system 11 including a zoom lens system according to at least one exemplary embodiment; a solid-state image pickup device (photoelectric converter) 12, such as a CCD sensor, which receives a subject image formed by the photographic optical system 11 and photoelectrically converts the received subject image; a memory 13 for recording information produced by the solid-state image pickup device 12 and corresponding to the subject image; and a finder 14 for observing the subject image displayed on a display device (not shown). The display device includes a liquid crystal panel or other equivalent image display apparatus as known by one of ordinary skill in the relevant art and displays the subject image formed on the solid-state image pickup device 12. A compact image pickup apparatus with high optical performance can be realized by incorporating the zoom lens system of the present invention into an image pickup apparatus, such as a video camera.

While the present invention has been described with reference to exemplary embodiments, it is to be understood that the invention is not limited to the discussed exemplary embodiments. The scope of the following claims is to be accorded the broadest interpretation so as to encompass all modifications, equivalent structures and functions.

This application claims the benefit of Japanese Application No. 2005-121170 filed Apr. 19, 2005, which is hereby incorporated by reference herein in its entirety.

What is claimed is:

1. A zoom lens system comprising, in order from an object side to an image side:
   a first lens unit of positive optical power;
   a second lens unit of negative optical power;
   a third lens unit of positive optical power, the third lens unit including, a first lens group, the first lens group consisting of three lens elements ordered from the object side to the image side, wherein the three elements are a positive lens element, a negative lens element, and a positive lens element; and
   a fourth lens unit of positive optical power, the fourth lens unit including a second lens group consisting of two lens elements of the second lens group arranged in order from the object side to the image side, the two lens elements being a positive lens element of the second lens group and a negative lens element of the second lens group, wherein the second lens unit and the fourth lens unit are moved during zooming; and
   the following conditions are satisfied:

$1.2 < \beta 4t/\beta 4w < 2.5$ $0.76 < f3/(fw \cdot ft)^{1/2} < 0.99$ $2.0 < f4/fw < 3.2$ where β4w is the imaging magnification of the fourth lens unit at a wide-angle end, β4t is the imaging magnification of the fourth lens unit at a telephoto end, f3 is the focal length of the third lens unit, f4 is the focal length of the fourth lens unit, fw is the focal length of the zoom lens system at the wide-angle end, and ft is the focal length of the zoom lens system at the telephoto end.

2. The zoom lens system according to claim 1, wherein the following condition is satisfied:

$0.33 < D3a/TD3 < 0.40$ where, in the third lens unit, D3a is a distance between the positive lens element closest to the object and the negative lens element second closest to the object, and TD3 is a distance between a lens surface closest to the object and a lens surface closest to the image.

3. The zoom lens system according to claim 1, wherein the following condition is satisfied:

$-0.20 < f4/R4r < 0.20$ where, in the fourth lens unit, R4r is the curvature radius of a lens surface closest to the image.

4. The zoom lens system according to claim 1, wherein the third lens unit includes an aperture stop.

5. The zoom lens system according to claim 4 wherein the aperture stop is arranged between the positive lens element of the first lens group closest to the object and the negative lens element of the first lens group second closest to the object.

6. The zoom lens system according to claim 1, wherein the following conditions are satisfied:

$4.9 < f1/fw < 5.5$ $-0.42 < f2/(fw \cdot ft)^{1/2} < -0.35$ where f1 is the focal length of the first lens unit and f2 is the focal length of the second lens unit.

7. The zoom lens system according to claim 1, wherein the zoom lens system forms an image on a solid-state image pickup device.

8. An image pickup apparatus comprising:
   the zoom lens system of claim 1; and
   a solid-state image pickup device for receiving an image formed by the zoom lens system.

* * * * *